United States Patent
Zimmer et al.

(10) Patent No.: US 6,464,150 B1
(45) Date of Patent: Oct. 15, 2002

(54) SPRAY DEVICE FOR A WINDSHIELD WASHER SYSTEM

(75) Inventors: Joachim Zimmer, Sasbach; Claus Fleischer, Buehl, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/700,570
(22) PCT Filed: Mar. 11, 2000
(86) PCT No.: PCT/DE00/00770
§ 371 (c)(1), (2), (4) Date: Dec. 18, 2000
(87) PCT Pub. No.: WO00/55019
PCT Pub. Date: Sep. 21, 2000

(30) Foreign Application Priority Data

Mar. 17, 1999 (DE) .......................................... 199 11 805

(51) Int. Cl.$^7$ ................................................. B05B 1/10
(52) U.S. Cl. .................... 239/284.1; 239/115; 239/438; 239/453; 239/602
(58) Field of Search .......................... 239/284.1, 284.2, 239/541, 533.13, 533.1, 437, 438, 439, 451, 114–117, 107, 453, 602, DIG. 12; 137/846

(56) References Cited

U.S. PATENT DOCUMENTS

| | | | | |
|---|---|---|---|---|
| 996,588 A | * | 6/1911 | Kennedy | ...................... 137/846 |
| 2,598,601 A | * | 5/1952 | Rappl | ...................... 239/284.1 |
| 3,008,649 A | * | 11/1961 | Bock et al. | .............. 239/284.1 |
| 3,017,120 A | * | 1/1962 | Friant et al. | ............. 239/284.1 |
| 4,387,879 A | * | 6/1983 | Tauschinski | ................ 137/846 |
| 5,323,963 A | | 6/1994 | Ballu | |
| 5,433,382 A | | 7/1995 | Baumgarten | |
| 5,975,431 A | * | 11/1999 | Harita et al. | ............. 239/284.1 |

FOREIGN PATENT DOCUMENTS

| | | | | |
|---|---|---|---|---|
| DE | 3709308 | * | 10/1987 | |
| DE | 198 15 171 A1 | | 6/1999 | |
| FR | 1251901 | * | 12/1960 | ............. 239/284.1 |
| FR | 2 673 254 A | | 8/1992 | |

* cited by examiner

Primary Examiner—Lesley D. Morris
Assistant Examiner—Dinh Q. Nguyen
(74) Attorney, Agent, or Firm—Michael J. Striker

(57) ABSTRACT

A spray device (10, 56, 58) for a window or glass washing system has a spray nozzle (14) that has a nozzle bore (50) and is supported in a nozzle housing (12) with a water connection and has a device that prevents a return flow and an uncontrolled escape of spraying water. The spray nozzle (14) is retained axially movably in the nozzle housing (12) and in the spraying operation is subjected to water pressure at a face end (24) toward the water connection (60), while with its other face end (26), it contacts a closure part (16, 38), which sealingly covers the nozzle bore (50) until it is brought, by an axial displacement of the spray nozzle (14), into an open position and uncovers the nozzle bore (50).

10 Claims, 3 Drawing Sheets

Figure 3:
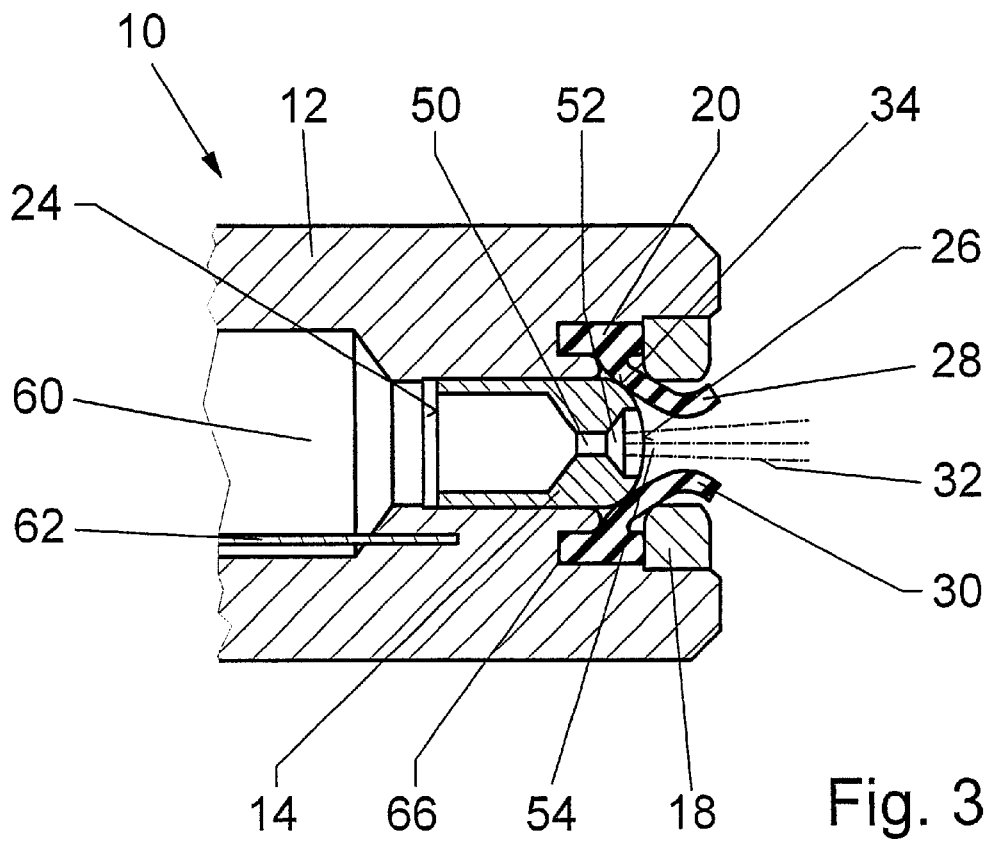

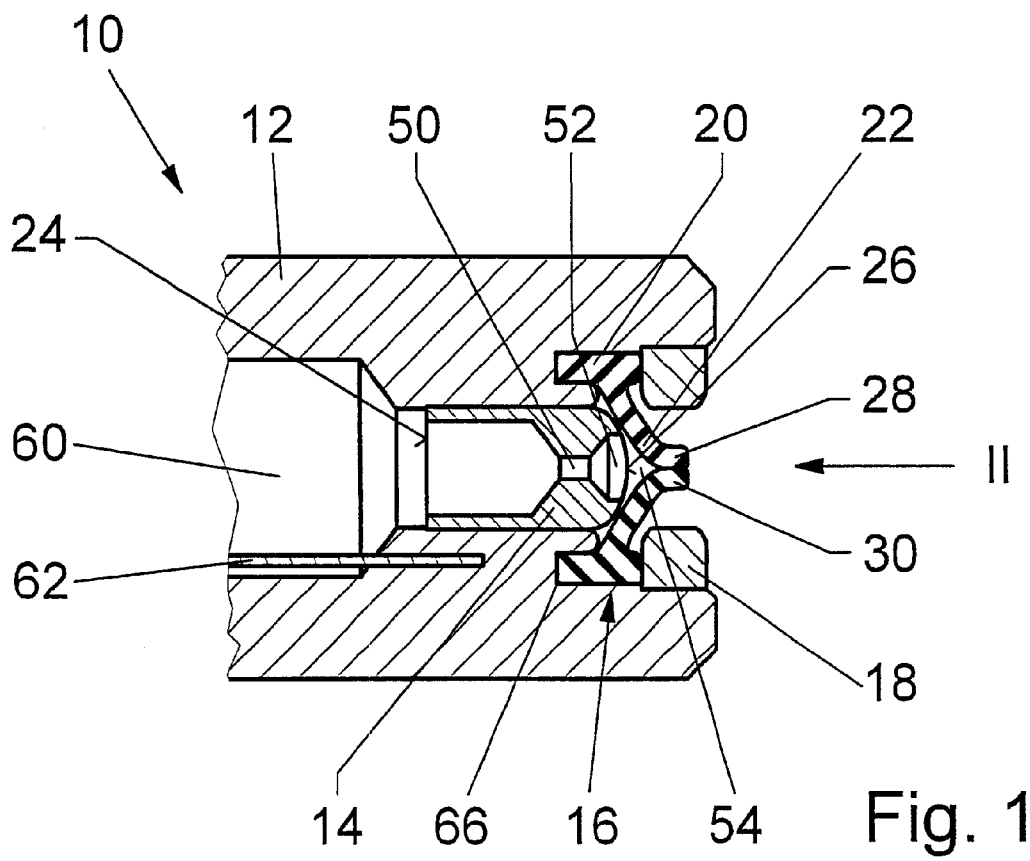
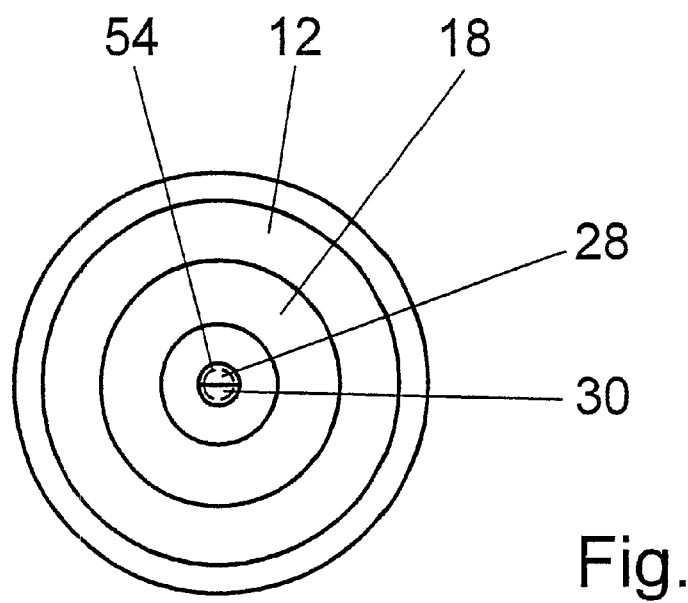

SPRAY DEVICE FOR A WINDSHIELD WASHER SYSTEM

PRIOR ART

The invention is based on a spray device for a window or glass washer system as generically defined by the preamble to claim 1.

As a rule, known window or glass washer systems for vehicles are used in conjunction with wipers. For headlights, it is sufficient in some cases to use them without wipers, but with a higher pressure. These systems are actuated if the moisture from precipitation is insufficient to clean the vehicle glass. They include a water tank, spray nozzles, and a pump that pumps water, with which cleaning and anti-freeze agents are mixed under some circumstances, under pressure out of the water tank via water lines to the spray nozzles. As a rule, the spray nozzles are secured to some part of a vehicle body, such as a hood over the engine compartment, a window frame, or the like.

To prevent the spray nozzles from freezing up at temperatures below the freezing point, heating elements are integrated with the spray nozzles; these elements are connected to an electrical power supply via plugs located on the outside. The heating elements make for a relatively high cost of production for the spray nozzles and complicate the tasks of assembly, laying the electrical lines and providing electrical contact for the plugs. However, heating devices are also known that are passed through a water supply line and are embodied as heating coils in the nozzle body.

It is also already known to secure spray nozzles as additional components on the wiper blade and thus to distribute the spraying water over the wiping region directly with a short stream length. Since the spraying water is concentrated on a region in the vicinity of the wiper blade and is wiped off again in the briefest time by the wiping motion, the view is hindered only briefly by the spraying water applied. A disadvantage of such systems is that the effects of weather, especially hail and extreme sunshine, have a major effect on the flexible parts of this arrangement, which are required for spanning the jointed regions between the wiper arm and the wiper blade. The spray nozzles and water lines that are exposed to the relative wind also freeze up quickly at temperatures below the freezing point, unless enough antifreeze is added to the water. As a rule, thawing the frozen water lines and spray nozzles again can be done only with major effort.

In an earlier German patent application, DE 198 15 171.3, a wiper arm is described on whose hinge element, or on a wiper rod integrally joined to the hinge element, spray nozzles are disposed. The spray nozzles are located in a nozzle body. The nozzle body is accommodated in a bulge of the hinge element with a spray opening for the spray stream, or is clipped, protruding downward, in a lateral mount on the wiper rod. It is also possible for two nozzle bodies to be provided, which are joined together by a rigid or flexible connecting piece. The nozzle bodies can be replaced easily and are well protected against environmental factors.

Expediently, the spray nozzle has an outward-opening check valve, which prevents the water line from running empty if the washer system goes unused for relatively long periods. These check valves for the most part operate on the order of the spring and ball system. They are intended to prevent the water line from becoming only partly filled, impeding the heat transfer from the heating element to the water. Furthermore, water residues can become locally overheated and can evaporate. This causes calcium deposits that over the course of time plug up the narrow conduits in the spray nozzle.

There are also simple versions in which the nozzle bodies are produced integrally and as an injection molded plastic part. The spray nozzles are either supported fixedly in the nozzle body or are adjustably supported via a ball seat. By means of the nozzle bodies distributed on the wiper arm, the spraying water is well distributed over the wiping region, especially if a spray stream is aimed directly in front of the wiper blade in a lower region. Because as a result of the arrangement the stream lengths are short, the relative wind can have only little effect on the spraying water distribution even at a relatively high vehicle speed.

Window or glass washer systems that are used without wipers are also known, where the geometry of the surface to be cleaned precludes the use of wipers. This pertains to washer systems for the panes of headlights.

ADVANTAGES OF THE INVENTION

According to the invention, the spray nozzle is retained axially movably in the nozzle housing. In the spraying operation, it is acted upon by water pressure on a face end toward the water connection, while with its other face end it contacts a closure part. The closure part sealingly covers the nozzle bore until it is brought into an open position by the axial displacement of the spray nozzle and uncovers the nozzle bore. The closure part is opened and kept open not by the emerging washing water but rather mechanically by the spray nozzle; the force that acts on the closure part to open it is determined by the level of the spray pressure and by the size of the effective end face, oriented toward the water connection, of the spray nozzle. At even a slight spray pressure, an adequate opening force can be generated by means of suitable dimensioning of the effective end face.

The closure part is expediently made from plastic and has a support ring, with which it is retained in the nozzle housing and/or in a nozzle body placed in the nozzle housing. The support ring is adjoined by a rubber-elastic diaphragm with a central, expandable opening and sealing lips, which are opened and closed by the axial motion of the spray nozzle and which in the open state permit an unhindered passage through them of the spray stream. Upon closure, they act as a sealing element. This arrangement and the design of the closure part make it possible for all the water-carrying components and conduits of the spray device to be closed in the phases of repose between washing phases. As a result, in wiper operation without a washing function, no washing water escapes, even at high wiping frequencies or in stroke-controlled wiper arms in which increased forces of acceleration act on the washing water. Consequently, less washing water is consumed. Since under some circumstances cleaning and antifreeze agents are also admixed with the water, their consumption is also reduced.

In the winter, the spray device has to be heated to assure proper function. To that end, a heating line is provided, which extends through the water connection and the nozzle housing to the vicinity of the spray nozzle. Since the water-carrying conduits remain filled until immediately before the emergence, on the one hand a good heat transfer between the heating line and the washing water and the spray nozzle is always assured. At the same time, the washing water is prevented from becoming overheated and evaporating, which could lead to harmful deposits in the water conduits and in the nozzle bore.

The closure part with its diaphragm and its sealing lips is designed structurally, and its elasticity is selected such, that upon opening it simultaneously generates a restoring force, which pushes the spray nozzle back into the position of repose. A spring mechanism can thus be dispensed with. The result is a simple design with only a few components, requiring little effort in assembly and with low costs. To provide that the elastic closure part is not overstressed by a high spray pressure, its opening motion is limited by a stop. This assures a defined opening geometry that does not hinder the spray stream, so that the spray stream, even at a relatively slight pump pressure, is capable of readily loosening the dirt and effectively cleaning the window or pane. This also prevents a high spray pressure from forcing the spray nozzle through the opening of the closure part.

The stop is expediently formed by a ring which at the same time restrains the closure part in the nozzle housing. A further variant is obtained by a design of the closure part that takes the form of a cap and is secured to the outer diameter of the nozzle housing. The stop is formed by a bead formed onto the closure part. In this inexpensive variant, the ring is omitted. In addition, the spray nozzle is well insulated in terms of heat by the caplike closure part made of plastic.

To enable optimally adjusting the spray stream, the spray nozzle is axially movably supported in a nozzle body that in turn is adjustably supported within a limited angular range via a ball seat in the nozzle housing. All the variants of the closure part can also be employed here. The compact design of the spray device is especially well suited to installation on a wiper arm.

DRAWING

In the drawing, exemplary embodiments of the invention are shown. The drawing, description and claims include numerous characteristics in combination. One skilled in the art will expediently consider the characteristics individually as well as combine them to make useful further combinations.

Figure 4:
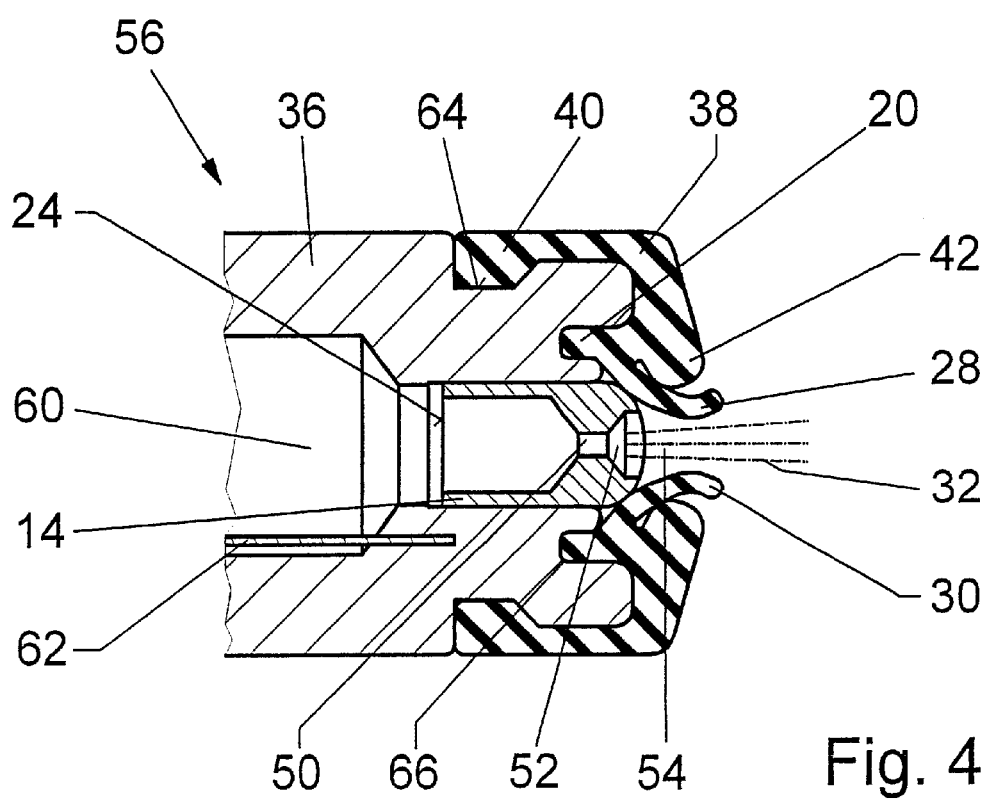

Shown are:

FIG. 1, a fragmentary longitudinal section through a spray device with a displaceable spray nozzle and with a closure part, in the closed state;

FIG. 2, a view in the direction of the arrow II in FIG. 1;

FIG. 3, a fragmentary longitudinal section through a spray device of FIG. 1 in the open state;

FIG. 4, a variant of FIG. 3; and

Figure 5:
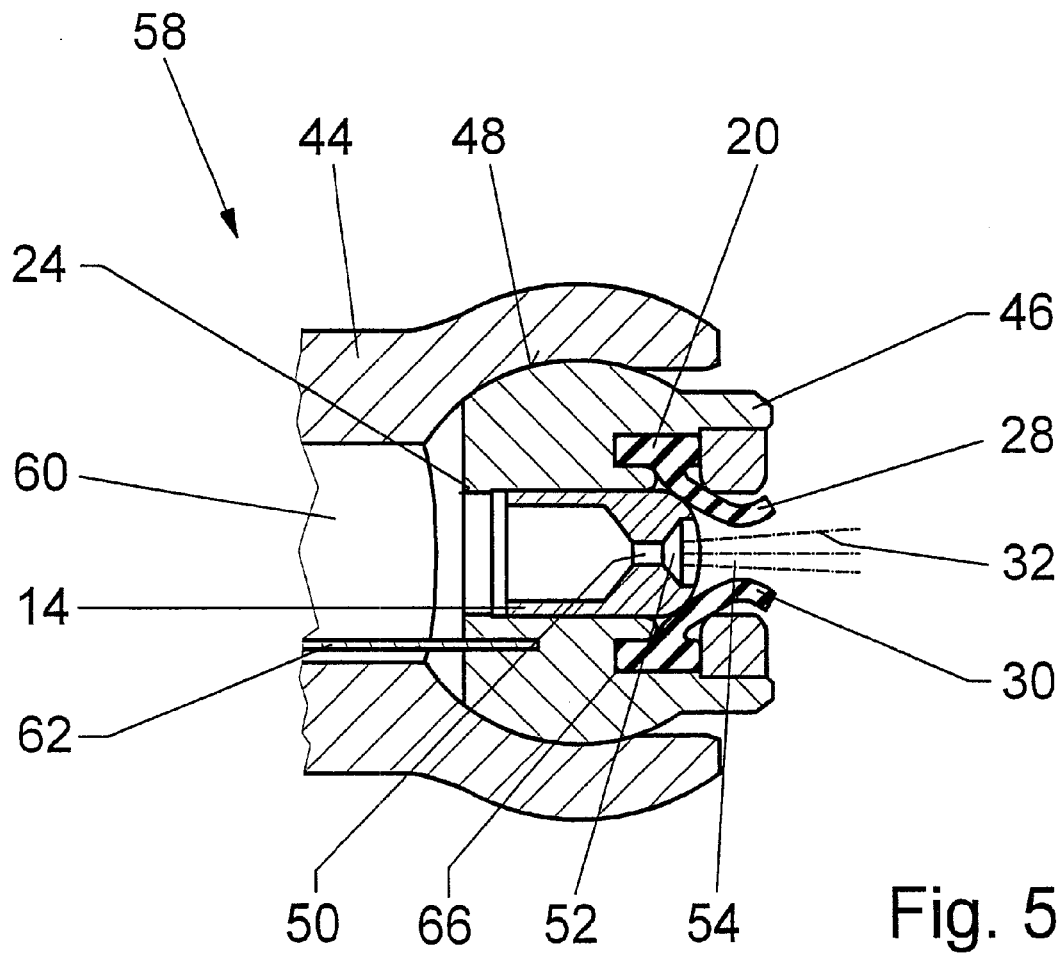

FIG. 5, a further variant of FIG. 3.

DESCRIPTION OF THE EXEMPLARY EMBODIMENTS

A spray device 10 of FIG. 1 has a spray nozzle 14, which has a nozzle bore 40 with a funnel-like widened portion 52, oriented toward the outlet, and is axially movably supported in a nozzle housing 12 with a water connection 60. In the spraying operation, the spray nozzle 14 is acted upon by water pressure on a face end 24 that is oriented toward the water connection 60, and with its other face end 26 it presses against the inside 34 of a closure part 16, which closes the nozzle bore 50 until the closure part is opened (FIG. 3) by the axial displacement of the spray nozzle 14.

The closure part 16 is made from plastic and has a support ring 20. The support ring is inserted into an indentation 66 on the face end of the nozzle housing 12 and surrounds a rubber-elastic diaphragm 22, which has a central, expandable opening 54 in the region of the nozzle bore 50. The opening 54 is adjoined by sealing lips 28 and 30, which in the closed state rest sealingly on one another with their sealing faces 68 and in the open state are spread apart by the spray nozzle 14 widely enough that a spray stream 32 can flow unhindered through them. In the process the opening 54 is expanded accordingly, and the initially flat sealing faces 68 of the sealing lips 28, 30 become slightly curved. A ring 18, which is press-fitted or screwed into the nozzle housing 12, serves to secure the closure part 16 by retaining the support ring 20 in the indentation 66, and at the same time it serves as a stop for the sealing lips 28 and 30 in the spraying operation.

When the pump is switched off, the water pressure is decreased, and an intrinsic tension defined by the geometry and elasticity of the closure part 16 pushes the spray nozzle 14 back into its position of repose, so that the opening 54 narrows again and the sealing lips 28 and 30 close.

FIG. 4 shows a spray device with a variant 38 of the closure part 16, which takes the form of a cap. On an end pointing toward the water connection 60, the closure part 38 has a bead 40, which is embedded in an annular groove 64 of the nozzle housing 36 and thus serves as a securing means. The closure part 38 is likewise an elastic element, and it has the above-described sealing lips 28 and 30. The stop for these sealing lips 28, 30 in the open state is formed by a bead 42, which is formed onto the closure part 38. In this variant as well, the opening mechanism of the sealing lips 28, 30 is as for the closure part 16, so that in both variants the stream geometry is determined primarily by the nozzle bore 50. A stop in the form of a ring 18 or a bead 42 secures a defined inside diameter in the spraying operation.

The spray nozzle 14 is either supported directly axially displaceably in the nozzle housing 12 (FIGS. 1, 3 or 4), or it is received in a nozzle body 46 which in turn is retained (FIG. 5) in the nozzle housing 44 via a ball seat 48. As a result, the nozzle bore 50 and with it the spray stream 32 can be adjusted within a limited angular range. Here the same closure parts 16, 38 as in the other variants can also be used.

For heating the spray device 10, 56, 58, a heating line 62 leads through the water connection 60 up to the vicinity of the spray nozzle 14, so that the heat output is concentrated on the spray nozzle 14 and the washing water. All the components that carry water are closed by the sealing lips 28 and 30 when the spray devices 10, 56, 58 are not actuated, so that no residual water can freeze and so that proper function is assured even at low temperatures.

What is claimed is:

1. A spray device (10, 56, 58) for a window or glass washer system, having a spray nozzle (14) that has a nozzle bore (50) and is supported in a nozzle housing (12) with a water connection and has a device that prevents a return flow and an uncontrolled escape of spraying water, characterized in that the spray nozzle (14) is retained axially movably in the nozzle housing (12) and in the spraying operation is subjected to water pressure on one face end (24) oriented toward the water connection (60), while with its other face end (26) it contacts a closure part (16, 38), which sealingly covers the nozzle bore (50) until this closure part is brought, by the axial displacement of the spray nozzle (14), into an open position and uncovers the nozzle bore (50).

2. The spray device (10, 56, 58) of claim 1, characterized in that the closure part (16, 38) has a support ring (20), with which it is retained in the nozzle housing (12) and/or in a nozzle body (46) supported therein, and which ring surrounds a rubber-elastic diaphragm (22) that has a central, expandable opening (54) in the region of the nozzle bore (50), which is adjoined by at least one outward-pointing sealing lip (28, 30) for closing the opening (54).

3. The spray device (10, 56, 58) of claim 2, characterized in that the intrinsic tension of the diaphragm (22) and/or of the sealing lip (28, 30) generates a restoring force for the spray nozzle (14).

4. The spray device (10, 58) of claim 2, characterized in that the support ring (20) is let into an annular indentation (66) on the face end of the nozzle housing (12) or the nozzle body (46) and is retained by a ring (18) that in the open state simultaneously acts as a stop.

5. The spray device (10, 58) of claim 4, characterized in that the ring (18) is press-fitted or screwed into the nozzle housing (12) or the nozzle body (46).

6. The spray device (56) of claim 2, characterized in that the closure part (38) is embodied as a closure cap, which surrounds the nozzle housing (12) and with a bead (40) engages an annular groove (64) of the nozzle housing (12).

7. The spray device (56) of claim 6, characterized in that the closure part (38) has a bead (42), which is formed on around the sealing lips (28, 30) and in the open state acts as a stop for the sealing lips (28, 30) and for the axial motion of the spray nozzle (14).

8. The spray device (58) of claim 1, characterized in that the spray nozzle (14) is supported axially displaceably on a nozzle body (46), and the nozzle body (46) is supported adjustably within a limited angular range in the nozzle housing (44) via a ball seat (48).

9. The spray device (10, 56, 58) of claim 1, characterized in that the opening (54) in the open state is so wide that a spray stream (32) flows unhindered through the opened sealing lips (28, 30) of the closure part (16, 38), the stream geometry being defined by the nozzle bore (50).

10. The spray device (10, 56, 58) of claim 1, characterized in that a heating line (62) is passed through the water connection (60) and a bore in the nozzle housing (12) to the vicinity of the spray nozzle (14).

* * * * *